A. E. YAEGER.
VEGETABLE OR MEAT PRESS.
APPLICATION FILED JAN. 4, 1911.
1,007,907.
Patented Nov. 7, 1911.
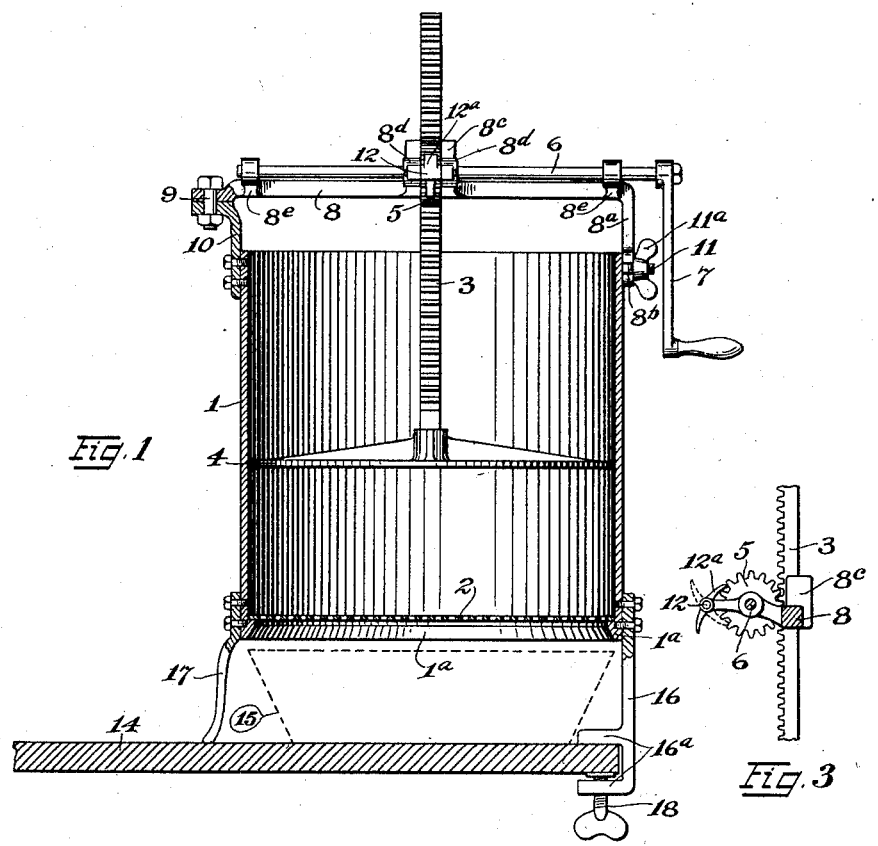
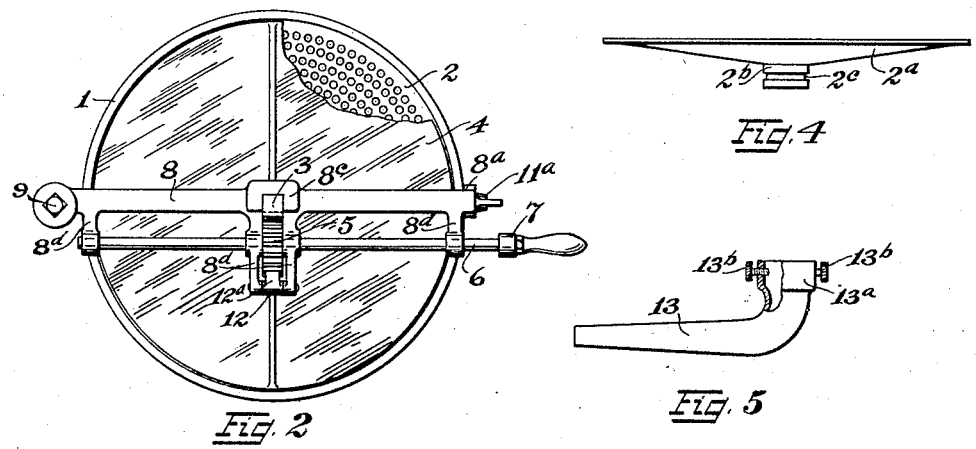

UNITED STATES PATENT OFFICE.

ADOLPH E. YAEGER, OF POTLATCH, IDAHO.

VEGETABLE OR MEAT PRESS.

1,007,907. Specification of Letters Patent. Patented Nov. 7, 1911.

Application filed January 4, 1911. Serial No. 600,764.

*To all whom it may concern:*

Be it known that I, ADOLPH E. YAEGER, a citizen of the United States, residing at Potlatch, in the county of Latah and State of Idaho, have invented certain new and useful Improvements in Vegetable or Meat Presses, of which the following is a specification.

My invention relates to improvements in vegetable presses, the primary object of the invention being to provide a vegetable press of simple, cheap, and efficient construction, particularly designed for household use.

As a vegetable press, the invention is admirably adapted for use as a potato masher, or as a fruit press for making cider, jells, and the like.

With the above mentioned and other ends in view, the invention consists in the novel construction, arrangement, and combination of parts, hereinafter described, illustrated in the accompanying drawings, and particularly pointed out in the appended claim.

Referring to the drawings forming a part of this specification, Figure 1, is a central vertical sectional view of the improved press in its operative position for use as a vegetable press or masher. Fig. 2, a top plan view of the same. Fig. 3, a detailed view of the rack and pinion mechanism, together with the double acting pawl for coöperating with the pinion in stopping the plunger rack at any desired position of its stroke. Fig. 4, a side elevation of the improved removable disk-head used in connection with the press body or plunger barrel when used as a meat press. Fig. 5, a side elevation of the improved revoluble spout used in connection with the improved disk head.

Similar numerals of reference designate like parts throughout all the figures of the drawings.

The improved press comprises a cylindrical body or plunger barrel 1, provided at its lower end with a reduced or inwardly extending annular disk supporting flange $1^a$, said flange being adapted to support a bottom disk member, such for example, as a colander or perforated strainer disk plate 2, as shown in Figs. 1 and 2; or a removable disk head $2^a$, as shown in Fig. 4, of the drawings. The disk members referred to are adapted to be inserted in the plunger body or barrel from above after the plunger has been elevated or removed and to rest within the plunger and upon the disk supporting flange $1^a$, as shown. A rack 3, and plunger head 4, are adapted to be reciprocated within the body or barrel 1, by means of a pinion 5, carried upon a driving shaft 6, said driving shaft 6, being provided at one end with an operating crank 7, and being mounted upon a pivotally mounted horizontally movable or swinging yoke member or frame 8, as hereinafter described. The yoke 8, is pivotally secured above and at one side of the body or barrel 1, by means of a pivot bolt 9, secured to a supporting arm 10, the outer or free end of the yoke being provided with a depending portion or member $8^a$, said member $8^a$, being provided with a recess $8^b$, adapted to receive and contain a stationary bolt 11, provided with a winged nut $11^a$, whereby the outer or free end of the yoke member may be secured in its normal position as illustrated in Figs. 1, and 2, of the drawings.

As a means for supporting and guiding the plunger rack 3, in proper position relative to the pinion 5, a guide head $8^c$, is formed upon the yoke 8, a pair of bearing arms $8^d$ extending from said guide-head, said bearing arms extending on either side of the pinion 5, and being provided at their outer ends with a double armed pawl 12, adapted to coöperate or to be thrown into and out of engagement with the teeth of the pinion 5, as illustrated in Fig. 3, of the drawings, whereby the rack 3, and plunger-head 4, may be held in any desired position of the rack and when the plunger-head 4, is elevated to its extreme upper position to clear the top of the plunger barrel (whereby the yoke member may be swung outwardly), the pawl 12, may be moved to reverse position indicated by dotted lines in Fig. 3, whereby to support the plunger-head and rack in an elevated position.

In adapting the improved press for use as a meat press, a removable disk-head $2^a$, is provided as illustrated in Fig. 4, of the drawings, said disk-head being preferably of dished form as shown and provided with an outlet opening surrounded by a flanged depending portion or sleeve $2^b$, said sleeve being provided with an annular groove $2^c$. A spout 13, is adapted to be revolubly mounted on the sleeve $2^b$, by means of a collar $13^a$, adapted to be slipped over the sleeve $2^b$, said collar being provided with retaining means such as a pair of thumb screws $13^b$, adapted to rest in the annular groove $2^c$, when moved to their retaining position and operating in a well known and understood manner, so that the spout 13ª, may be moved about under the body of the press when the disk-head 2ª, is mounted in the plunger barrel 1, in lieu of the perforated disk plate 2, shown in Fig. 1, of the drawings.

The upper member 12ª, of the pawl 12, is preferably somewhat heavier than the lower member so that the pawl is normally held in the position indicated during the downward movement of the rack 3, as indicated in the drawings, and the ends of the driving shaft 6, are supported in bearing arms 8ᵈ, extending from the yoke 8, as shown.

As a means for conveniently mounting and attaching the improved press upon the table top 14, as well as providing a suitable receptacle receiving space for a receptacle such as a dish 15, indicated by dotted lines in Fig. 1, of the drawings, a clamping leg 16, is provided at the front, and in the present instance a supporting leg 17, at the rear, said legs being elevated sufficiently to provide the space indicated, the clamping leg 16, terminating in clamping wing members 16ª, one of which is provided with the usual clamping screw or thumb bolt 18.

From the foregoing description, taken in connection with the accompanying drawings, the operation and advantages of my invention will be readily understood.

Having thus described my invention, what I claim and desire to secure by Letters Patent is,—

In a vegetable or meat press, a plunger barrel provided with a clamping leg at its front and a supporting leg at its rear and elevated by said legs providing a receptacle receiving space intermediate said legs and the plunger barrel and subjacent table.

In testimony whereof I have affixed my signature in presence of two witnesses.

ADOLPH E. YAEGER.

Witnesses:
JAMES L. SINCLAIR,
GROVER C. MALTBY.

Copies of this patent may be obtained for five cents each, by addressing the "Commissioner of Patents, Washington, D. C."